US012184086B2

(12) United States Patent
Rutman et al.

(10) Patent No.: US 12,184,086 B2
(45) Date of Patent: Dec. 31, 2024

(54) BASEPLATE INDUCTIVE ELECTRICAL CONNECTION SYSTEM

(71) Applicant: Ford Global Technologies, LLC, Dearborn, MI (US)

(72) Inventors: Matthew B. Rutman, Canton, MI (US); Stuart C. Salter, White Lake, MI (US); Michael M. Azzouz, Farmington, MI (US); Michael Lozano, Detroit, MI (US); Eric Scott Levine, Novi, MI (US); Jeff Sturges, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 17/851,394

(22) Filed: Jun. 28, 2022

(65) Prior Publication Data
US 2023/0112363 A1    Apr. 13, 2023

Related U.S. Application Data

(60) Provisional application No. 63/254,317, filed on Oct. 11, 2021.

(51) Int. Cl.
*H02J 50/40* (2016.01)
*B60R 16/03* (2006.01)
(Continued)

(52) U.S. Cl.
CPC ............. *H02J 50/40* (2016.02); *B60R 16/03* (2013.01); *F21V 15/01* (2013.01); *H01F 38/14* (2013.01);
(Continued)

(58) Field of Classification Search
CPC .. H02J 50/40; H02J 50/80; H02J 50/10; H02J 50/005; H04B 5/79; B60R 16/03; F21V 15/01; H01F 38/14
(Continued)

(56) References Cited

U.S. PATENT DOCUMENTS 5,640,135 A  *  6/1997  Hall ........................ H01F 38/14
                                                        336/212
5,684,380 A  *  11/1997  Woody .................... B60L 53/34
                                                        320/108
(Continued)

FOREIGN PATENT DOCUMENTS

CN     2015323103 U       12/2021
DE     102015006707 A1 *  12/2016  ............. G08C 17/02
(Continued)

OTHER PUBLICATIONS

US 10,947,009 B2, 03/2021, Brunner et al. (withdrawn)

*Primary Examiner* — Gary F Paumen
(74) *Attorney, Agent, or Firm* — Vichit Chea; Carlson, Gaskey & Olds, P.C.

(57) ABSTRACT

An inductive connection system includes a baseplate that provides an attachment interface on a support surface. The baseplate is configured to engage with at least one accessory via the attachment interface to secure the accessory to the support surface. The attachment interface provides a plurality of different mounting positions for the at least one accessory. At least one puck is selectively coupled to the attachment interface to provide a desired one of the plurality of different mounting positions. One of the at least one puck and the at least one accessory includes an inductive transmitter and the other of the at least one puck and the at least one accessory includes an inductive receiver such that the at least one puck in the baseplate and the at least one accessory electrically connect to each other through a wireless elec-
(Continued)

trical power link between the inductive transmitter and the inductive receiver when the at least one accessory is mounted in the desired one of the plurality of different mounting positions.

20 Claims, 3 Drawing Sheets

(51) Int. Cl.
    *F21V 15/01* (2006.01)
    *H01F 38/14* (2006.01)
    *H02J 50/00* (2016.01)
    *H02J 50/10* (2016.01)
    *H02J 50/80* (2016.01)
    *H04B 5/79* (2024.01)

(52) U.S. Cl.
    CPC ............ *H02J 50/005* (2020.01); *H02J 50/10* (2016.02); *H02J 50/80* (2016.02); *H04B 5/79* (2024.01)

(58) Field of Classification Search
    USPC .......................................... 439/950
    See application file for complete search history.

(56) References Cited

U.S. PATENT DOCUMENTS

| | | |
|---|---|---|
| 10,583,962 B2 | 3/2020 | Brunner et al. |
| 10,703,534 B2 | 7/2020 | Brunner et al. |
| D895,966 S | 9/2020 | Brunner et al. |
| D895,967 S | 9/2020 | Brunner et al. |
| D896,517 S | 9/2020 | Brunner et al. |
| D896,518 S | 9/2020 | Brunner et al. |
| D897,103 S | 9/2020 | Brunner et al. |
| D898,320 S | 10/2020 | Brunner et al. |
| 10,962,218 B2 | 3/2021 | Plato et al. |
| 10,981,696 B2 | 4/2021 | Brunner et al. |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| 11,027,883 B1 | 6/2021 | Brunner et al. |
| D920,671 S | 7/2021 | Brunner et al. |
| D923,935 S | 7/2021 | Brunner et al. |
| 11,120,590 B1 * | 9/2021 | Cecchi ................. G06F 8/34 |
| 11,192,690 B1 | 12/2021 | Brunner et al. |
| 11,268,691 B2 | 3/2022 | Plato et al. |
| 11,365,026 B2 | 6/2022 | Brunner et al. |
| 11,427,382 B2 | 8/2022 | Brunner et al. |
| 11,465,805 B2 | 10/2022 | Brunner et al. |
| 2017/0090134 A1 * | 3/2017 | Williams ................ H02J 50/80 |
| 2018/0337549 A1 * | 11/2018 | Chen ..................... H02J 50/10 |
| 2020/0328614 A1 * | 10/2020 | Jackson ................ G04C 10/04 |
| 2021/0099031 A1 * | 4/2021 | Jol ........................ H04B 5/70 |
| 2022/0037934 A1 | 2/2022 | Hortop |

FOREIGN PATENT DOCUMENTS

| | | | |
|---|---|---|---|
| EP | 3799252 A1 * | 3/2021 | ......... G06K 7/10237 |
| KR | 20210122502 A | 10/2021 | |
| WO | WO-2011135571 A2 * | 11/2011 | .............. H02J 5/005 |
| WO | WO-2020160290 A1 * | 8/2020 | ............ H02J 50/005 |

* cited by examiner

BASEPLATE INDUCTIVE ELECTRICAL CONNECTION SYSTEM

CROSS-REFERENCE TO RELATED APPLICATIONS

This application claims priority to U.S. Provisional Application No. 63/254,317, which was filed on 11 Oct. 2021 and is incorporated herein by reference.

TECHNICAL FIELD

This disclosure relates generally to an attachment system and, more particularly, to an attachment system that is used to secure accessories to a vehicle.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite.

SUMMARY

In some aspects, the techniques described herein relate to an inductive connection system, including: a baseplate that provides an attachment interface on a support surface, the baseplate configured to engage with at least one accessory via the attachment interface to secure the accessory to the support surface, and wherein the attachment interface provides a plurality of different mounting positions for the at least one accessory; and at least one puck selectively coupled to the attachment interface to provide a desired one of the plurality of different mounting positions, wherein one of the at least one puck and the at least one accessory includes an inductive transmitter and the other of the at least one puck and the at least one accessory includes an inductive receiver such that the at least one puck in the baseplate and the at least one accessory electrically connect to each other through a wireless electrical power link between the inductive transmitter and the inductive receiver when the at least one accessory is mounted in the desired one of the plurality of different mounting positions In some aspects, the techniques described herein relate to an attachment system, wherein the at least one puck comprises a head portion and a foot portion that is selectively moveable between a locked position where the at least one puck cannot be detached from the baseplate and an unlocked position where the at least one puck can be detached from the baseplate.

In some aspects, the techniques described herein relate to an attachment system, wherein the attachment interface comprises a plurality of puck holes formed within the baseplate, and wherein the plurality of puck holes are each configured to receive the foot portion such that once the foot portion is inserted through a selected one of the plurality of puck holes, the head portion is then rotated to move the at least one puck into the locked position.

In some aspects, the techniques described herein relate to an attachment system, wherein the foot portion includes beveled sides to facilitate insertion through the selected one of the plurality of puck holes.

In some aspects, the techniques described herein relate to an attachment system, wherein the head portion and the foot portion are coupled together with at least one fastener connection that comprises a male portion secured to one of the head portion and the foot portion and a female portion that receives the male portion, and including a resilient member that cooperates with the at least one fastener connection to provide spring-loaded clamping which allows a desired range of compensation movement between the head portion and the foot portion.

In some aspects, the techniques described herein relate to an attachment system, wherein the at least one puck comprises a polygonal shape.

In some aspects, the techniques described herein relate to an attachment system, wherein the at least one puck comprises a plurality of pucks and the attachment interface comprises a plurality of puck holes formed within the baseplate, and wherein two or more of the plurality of pucks are inserted into selected ones of the plurality of puck holes to provide multiple desired mounting positions for two or more accessories.

In some aspects, the techniques described herein relate to an attachment system, the system including a setup feature to determine where the two or more of the plurality of pucks have been inserted in the baseplate.

In some aspects, the techniques described herein relate to an attachment system, wherein the setup feature comprises one or more of the following: a user actuated setup button which generates a first command to connect with each accessory and to instruct each accessory to turn off, and then generates a second command to turn on each puck one by one to learn which pucks match which accessory; a camera that identifies where each puck is located on the baseplate; NFC or RFID tag that identify puck location; unique QR code on each puck that can be scanned by a smart device; a map is made of where each accessory is placed such that as accessories are placed over the pucks, the inductive transmitter and inductive receiver power up and report activation.

In some aspects, the techniques described herein relate to an attachment system, wherein all pucks of the plurality of pucks are powered in parallel.

In some aspects, the techniques described herein relate to an attachment system, wherein all pucks of the plurality of pucks are powered individually or by way of a switch.

In some aspects, the techniques described herein relate to an attachment system, wherein each accessory includes a band shield to prevent any electromagnetic effects from affecting external surroundings.

In some aspects, the techniques described herein relate to an attachment system, wherein each accessory includes a seal extending around a lower periphery of the accessory to prevent water and/or debris from entering a space between the accessory and the baseplate that surrounds the at least one puck.

In some aspects, the techniques described herein relate to an inductive connection system, including: a baseplate that provides an attachment interface on a support surface, the baseplate configured to engage with a plurality of accessories via the attachment interface to secure the plurality of accessories to the support surface, and wherein the attachment interface provides a plurality of different mounting positions for the plurality of accessories; and a plurality of pucks selectively coupled to the attachment interface to provide a desired one of the plurality of different mounting positions for each accessory, wherein each puck includes an inductive transmitter and each accessory includes an inductive receiver such that the pucks in the baseplate and the plurality of accessories electrically connect to each other through a wireless electrical power link between the inductive transmitters and the inductive receivers when the plurality of accessories are mounted in the desired mounting positions.

In some aspects, the techniques described herein relate to an attachment system, wherein the attachment interface comprises a plurality of puck holes formed within the baseplate, and wherein each puck comprises a head portion and a foot portion that is selectively moveable between a locked position where puck cannot be detached from the baseplate and an unlocked position where the puck can be detached from the baseplate, and wherein the plurality of puck holes are each configured to receive the foot portion such that once the foot portion is inserted through a selected one of the plurality of puck holes, the head portion is then rotated to move the at least one puck into the locked position.

In some aspects, the techniques described herein relate to an attachment system, wherein the attachment interface further comprises a plurality of mounting holes, and wherein each accessory includes at least one accessory foot that is inserted within one of the plurality of mounting holes.

In some aspects, the techniques described herein relate to an attachment system, wherein the at least one puck comprises a diamond shape.

In some aspects, the techniques described herein relate to an attachment system, the system including a setup feature to determine where two or more of the plurality of pucks have been inserted in the baseplate, wherein the setup feature comprises one or more of the following: a user actuated setup button which generates a first command to connect with each accessory and to instruct each accessory to turn off, and then generates a second command to turn on each puck one by one to learn which pucks match which accessory; a camera that identifies where each puck is located on the baseplate; NFC or RFID tag that identify puck location; unique QR code on each puck that can be scanned by a smart device; a map is made of where each accessory is placed such that as accessories are placed over the pucks, the inductive transmitter and inductive receiver power up and report activation.

In some aspects, the techniques described herein relate to an inductive connection method, including: engaging at least one accessory to an attachment interface of a baseplate that provides a plurality of different mounting positions for the at least one accessory;
  selectively coupling at least one puck to the attachment interface to provide a desired one of the plurality of different mounting positions, wherein one of the at least one puck and the at least one accessory includes an inductive transmitter and the other of the at least one puck and the at least one accessory includes an inductive receiver; and
  electrically connecting the puck in the baseplate to the at least one accessory through a wireless electrical power link between the inductive transmitter and the inductive receiver when the at least one accessory is mounted in the desired one of the plurality of different mounting positions.

In some aspects, the techniques described herein relate to an attachment method, the method including providing the at least one puck with a head portion and a foot portion, and selectively moving the foot portion between a locked position where the at least one puck cannot be detached from the baseplate and an unlocked position where the at least one puck can be detached from the baseplate.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a baseplate-based accessory attachment system for a vehicle or stationary application. The baseplate of the system provides an inductive power module connection interface for securing accessories/modules to a stationary support component or a vehicle such that power can be supplied to the accessories/modules. Various types of accessories or modules that require power can be secured through the inductive power module connection interface provided by a baseplate. The mounting orientation of the accessories and modules can be adjusted as needed using the same inductive power module connection interface. This provides a user with a substantially modular attachment system.

A modular inductive electrical power system disclosed here provides a new method to allow the flexibility of a durable wireless electrical power system to allow internally or externally mounted upfit based power accessories/modules within the vehicle. This system enables the possibility of a switched or automatic power-up power supply to the accessory or module upon engagement of the accessory or module within its associated accessory mounting system on the baseplate. The modular inductive electrical power system is composed of a source inductive power generation/transmitter module, associated with one of the vehicle and module, and a secondary inductive power receiver module associated with the other of the vehicle and module, which when aligned with each other generates power to operate the upfit or functional accessory or module.

There are often situations where it would be useful for the vehicle owner to be able to switch between different upfit systems to enable different functional capabilities, or to temporarily remove an upfit accessory or module to allow the module or its contents to be used off the vehicle, then reattach the module once the desired operation or task is completed. Traditional upfit integration of elements into a vehicle ecosystem by hard wiring, and bolt on physical attachment make it difficult to easily change different types of accessories or modules for use in different applications. The subject disclosure provides an integration method that allows both the mechanical and electrical attachment to the vehicle via a quick connect/disconnect capability.

The exemplary modular inductive electrical power system is designed to complement the quick connect/disconnect mechanical system. In one example, the modular inductive electrical power system solution provides the option to create a wireless electrical power link between a fixed inductive power generation module integrated into a surface within the vehicle and a removable accessory or module containing the inductive power receiver module.

Figure 1:
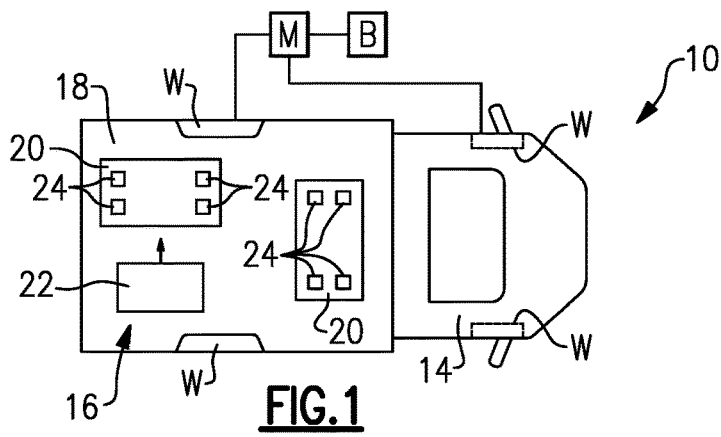
FIG. 1 illustrates a top view of a vehicle having a cargo bed equipped with baseplates that can be used to secure an accessory according to an exemplary aspect of the present disclosure.
Figure 2:
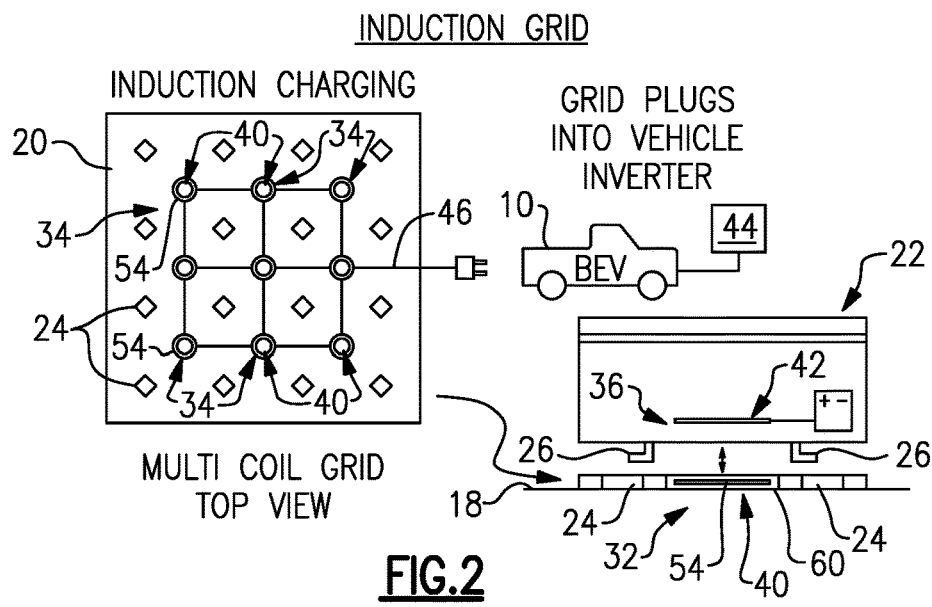
FIG. 2 schematically illustrates an induction grid system that couples to a vehicle power source in a vehicle to provide a wireless power link to an accessory.

FIGS. 1-8C disclose an exemplary embodiment of the accessory attachment system that utilizes the modular inductive electrical power system. With reference to FIGS. 1 and 2, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional vehicle.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

In the exemplary embodiment, one or more baseplates 20 are secured directly to the floor 18 of the cargo bed 16. A single baseplate 20 can be used to cover the cargo bed 16 or several baseplates 20 can be used to cover all, or portions, of the cargo bed 16. The baseplates 20 can have different sizes and shapes. Various accessories and/or modules 22 can be secured to the vehicle 10 by engaging one or more of the baseplates 20. The accessories/modules 22 can include a lockable storage box that holds tools, a refrigerator, etc. The accessory 22 could be a lidded lockable container that includes a compartment for storing power tools or other items that require power or data connection.

With reference now to FIG. 2 and continued reference to FIG. 1, the accessories 22 can engage one or more of the baseplates 20 using an attachment system. In the exemplary embodiment, the attachment system includes a plurality of apertures 24 and at least one foot 26 that cooperate to provide a mechanical connection interface. The baseplate 20 is attached to a vehicle surface with an additional attachment interface that is separate from the mechanical connection interface for the accessories 22.

In this example, the baseplates 20 provide the apertures 24 and the accessories 22 include a plurality of feet 26. This could be rearranged, however, such that one or all of the feet 26 extend from the baseplates 20 and the accessories 22 provide some or all of the apertures 24.

In the exemplary embodiment, when the baseplate 20 and the accessories 22 are engaged, the feet 26 are each received within one of the apertures 24 such that the feet 26 each extend from a first side 28 of the baseplate 20, through one of the apertures 24, and past an opposite, second side 30 of the baseplate 20.

Mechanical fasteners, welds, or other methods of attachment could be used to secure the baseplates 20 to the floor 18. The apertures 24 are spaced upwardly from the floor 18 by an open gap such that the feet 26 from the accessory can be easily inserted into the baseplate 20 to attach the accessory 22 to the baseplate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory having specialized tools for the second type of job.

In the subject disclosure, the accessory 22 comprises a power module comprising a lockable box that is electrically coupled to the vehicle 10 through the baseplate 20. This allows the devices within the lockable box to be powered from a vehicle power supply 44. For example, the internal device could be a refrigerated container that is powered by the vehicle 10 when the box is engaged with the baseplate 20. In another example, the devices within the lockable box could comprise rechargeable tools, which can be recharged when set within the box and coupled to the wireless charging interface between the accessory 22 and the baseplate 20.

An example of an accessory attachment method includes the step of attaching an accessory 22 to a baseplate 20 supported by the vehicle 10 by inserting at least one foot 26 through an aperture 24 to mechanically lock the at least one foot 26 in place while simultaneously electrically connecting the accessory 22 to the baseplate 20 through a wireless electrical power link 32. As shown in FIG. 2, the baseplate 20 includes apertures 24 that are configured to receive four feet 26 (FIG. 2, only two feet are shown) of the accessory 22. The baseplate 20 also includes areas 34 that provide the wireless electrical power link 32. In one example, the baseplate 20 includes multiple areas 34 that are positioned in any desired configuration on the baseplate 20. The areas 34 can be selectively modified by a user to support many different mounting configurations for the accessories. The accessory 22 includes a corresponding area 36 that is generally centrally located on the accessory 22, and the feet 26 are spaced apart from each other about a periphery of a bottom surface of the accessory 22. The baseplate 20 engages with the accessory 22 to secure the accessory 22 to the vehicle 10 while simultaneously electrically connecting the accessory 22 to the baseplate 20 via the wireless electrical power link 32.

In one example, the wireless electrical power link 32 comprises an inductive power generation module 40 associated with one of the baseplate 20 and the accessory 22 and an inductive power receiver module 42 associated with the other of the baseplate 20 and the accessory 22. In the example shown in FIG. 2, the inductive power generation module 40 is fixed to the baseplate 20 and the inductive power receiver module 42 is mounted to the accessory 22 such that the inductive power receiver module 42 is moveable with the accessory 22. In one example, a plurality of inductive power generation modules 40 are selectively mounted to the baseplate 20 in a desired configuration. This allows for multiple accessories to be mounted to the baseplate 20 at one time. The inductive power generation modules 40 are electrically linked together via a power distribution harness 46 which is connected to the vehicle power supply 44.

When the accessory 22 is attached to the baseplate 20, the feet 26 are inserted into the corresponding apertures 24 to mechanically attach the accessory 22 to the baseplate 20 in one of a plurality of mounting orientations. The accessory 22 is configured to be selectively detachable from one mounting orientation on the baseplate 20 such that the accessory 22 can immediately be reattached in a different one of the mounting orientations. In each of the different mounting orientations, at least one of the inductive power generation modules 40 is generally aligned with the inductive power receiver module 42.

In the example shown in FIG. 2, the inductive power generation module 40 receives power from the vehicle power supply 44 via the power distribution harness 46. The inductive power generation module 40 includes power generating coils and the inductive power receiver module 42 includes power generating coils that interact with each other to provide the wireless electrical power link 32. Interaction and operation of the inductive power generation module 40 and the inductive power receiver module 42 is described in greater detail in application Ser. No. 17/716,053, filed Apr. 8, 2022, which is assigned to the assignee hereof and is incorporated by reference.

Figure 3:
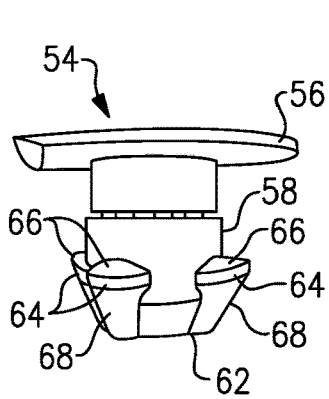
FIG. 3 is a perspective view of a transmitting puck as used in the induction grid system of FIG. 2.
Figure 4:
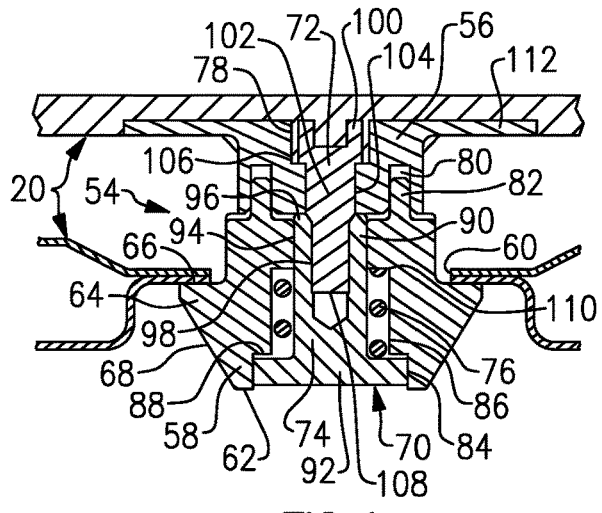
FIG. 4 is a section view of the puck of FIG. 3 as installed in the induction grid system of FIG. 2.

With reference to FIGS. 3-4, in one example, the inductive power generation module 40 comprises at least one puck 54 selectively coupled to the baseplate 20 to provide a desired one of the plurality of different mounting positions. As discussed above, one of the puck 54 and the accessory 22 includes an inductive transmitter and the other of the puck 54 and the accessory 22 includes an inductive receiver. In the example shown, the puck 54 includes the inductive transmitter and the accessory 22 includes the inductive receiver such that the puck 54 in the baseplate 20 and the accessory 22 electrically connect to each other through the wireless electrical power link 32 between the inductive transmitter and the inductive receiver when the accessory 22 is mounted in the desired one of the plurality of different mounting positions.

Figure 5A:
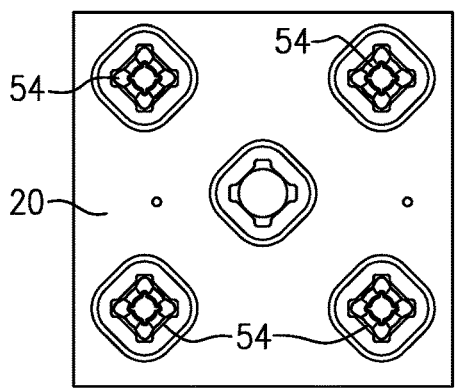
FIG. 5A is a top view of pucks installed on a baseplate in an unlocked position.
Figure 5B:
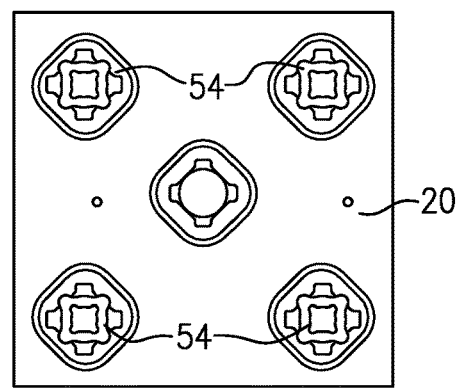
FIG. 5B is a top view of pucks installed on a baseplate in a locked position.

In one example, each puck 54 comprises a head portion 56 and a foot portion 58 that is selectively moveable between a locked position where the puck 54 cannot be detached from the baseplate 20 (FIG. 5B) and an unlocked position where the puck 54 can be detached from the baseplate 20 (FIG. 5A). With reference to FIGS. 2 and 5A-5B, the apertures 24 in the baseplate 20 can comprise a plurality of puck holes to receive the power transmitting pucks 54 and/or mounting feet holes to receive the mounting feet of the accessory 22. FIG. 2 shows one example configuration of pucks 54 being installed in a desired configuration in selected puck holes. The remaining empty holes can receive mounting feet 26 of the accessories 22.

FIG. 4 shows a transmitting puck 54 inserted into a puck hole 60 in the baseplate 20. Each puck hole 60 is configured to receive the foot portion 58 such that once the foot portion 58 is inserted through the selected puck hole 60, the head portion 56 is then rotated to move the puck 54 into the locked position. In one example, the pucks 54 and holes 60 have a polygonal shape. In the example shown in FIGS. 3-4 and 5A-5B, the pucks 54 and holes have a diamond shape. As shown in FIG. 5A, the diamond-shaped pucks 54 are aligned with and inserted through the diamond-shaped holes 60. The pucks 54 are then rotated either clockwise or counterclockwise to a position where the diamond-shaped pucks 54 are not aligned with the diamond-shaped holes 60 to lock the pucks 54 in place as shown in FIG. 5B. To unlock the pucks 54, the pucks are rotated to align the diamond-shaped pucks 54 with the diamond-shaped holes 60 (FIG. 5A) such that the pucks 54 can be detached from the baseplate 20.

As shown in FIGS. 3-4, the foot portion 58 includes beveled sides to facilitate insertion through the selected one of the plurality of puck holes 60. In one example, the foot portion 58 has a distal end face 62 and protruding portions 64 spaced apart from each other about an outer periphery of the foot portion 58. The protruding portions 64 extend from the distal end face 62 upwardly to terminate at an engagement surface 66. The engagement surface 66 comprises a generally flat surface that abuts directly against a lower surface of the baseplate 20 when the pucks 54 are in the locked position. The protruding portions 64 gradually and continuously increase in thickness from the distal end face 62 to the engagement surface 66 to provide angled/beveled side surface 68. The angled/beveled side surfaces 68 facilitate sliding movement of the puck 54 through the hole 60. Additionally, the protruding portions 64 can comprise resilient members that compress inwardly during insertion and then expand back outwardly once the protruding portions 64 have passed through the hole 60. Once inserted, the pucks 54 can be rotated into the locked position.

In one example, the head portion 56 and the foot portion 58 are coupled together with at least one fastener connection 70 that comprises a male portion 72 secured to one of the head portion 56 and the foot portion 58, and a female portion 74 that receives the male portion 72. A resilient member 76 cooperates with the at least one fastener connection 70 to provide spring-loaded clamping which allows a desired range of compensation movement between the head portion 56 and the foot portion 58 along a vertical axis. In the example shown in FIG. 4, the male portion 72 comprises a threaded member that is received within an opening 78 in the head portion 56. An internal groove or trench 80 is radially outward of the opening 78 and extends around the opening 78. The foot portion 58 includes a protruding lip or rib 82 that is received within the trench 80.

The foot portion 58 also includes an opening 84 in the distal end face 62 that transitions into an internal cavity 86 that is narrower than the opening 84 to provide a ledge 88. The female portion 74 of the fastener connection 70 comprises a fastener body 90 with an enlarged head 92. The head 92 has an increased diameter relative to the body 90 such that the head 92 fits in the opening 84 and is capable of engaging against the ledge 88 as a stop surface. The body 90 extends into and through the internal cavity 86. The internal cavity 86 transitions into another opening 94 that is narrower than the internal cavity 86. A distal end 96 of the body 90 is received within the opening 94. The body 90 also include a threaded internal cavity 98.

The male portion 72 of the fastener connection 70 includes a head portion 100 and a threaded body 102 that has a smaller diameter than the head portion 100. The opening 78 in the head portion 56 transitions into an unthreaded cavity 104 that is narrower than the opening 78 to provide a ledge 106. The head portion 100 of the male portion 72 fits within the opening 78 such that the head portion 100 rests against the ledge 106. The threaded body 102 extends through the unthreaded cavity 104 such that a distal end 108 of the threaded body 102 extends outward from the head portion 56.

Another ledge 110 is formed within the internal cavity 86 of the foot portion 58 at a location where the internal cavity 86 transitions into the opening 94. The resilient member 76 is positioned within the internal cavity 86 and reacts between the ledge 110 and the head 92 of the female portion 74. The head portion 56 and foot portion 58 are connected to each other by threading the threaded body 102 of the male portion 72 into the threaded internal cavity 98 of the female portion 74. This threading engagement pulls the foot portion 58 toward the head portion 56 along a vertical axis. As shown in FIG. 4, the head portion 56 includes a flange 112 that surrounds the opening 78. The head portion 56 and foot portion 58 are threaded into engagement with each other such that the flange 112 of the head portion 56 sits flush with an upper surface of the baseplate 20 and the engagement surface 66 of the protruding portion 64 abuts against a lower surface of the baseplate 20. The resilient member 76 allows for linear compensation movement between the head portion 56 and the foot portion 58. This provides spring-loaded clamping with a desired amount of "float" along a z-axis and to mitigate vibration. In one example, the float is approximately 2 mm; however, other amounts are possible. The float is limited by engagement of the head 92 against the ledge 88.

Figure 6:
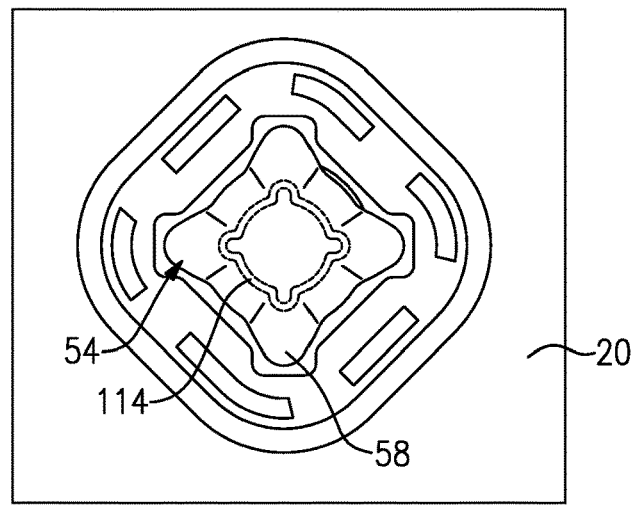
FIG. 6 is a bottom view of a coil wrapped around a diamond shaped puck.

FIG. 6 shows a transmitting coil 114 that is provided on the puck 54. In one example, the coil 114 is wrapped around the diamond shape of the puck 54. This minimizes the size of the inductive coil 114.

Figure 7:
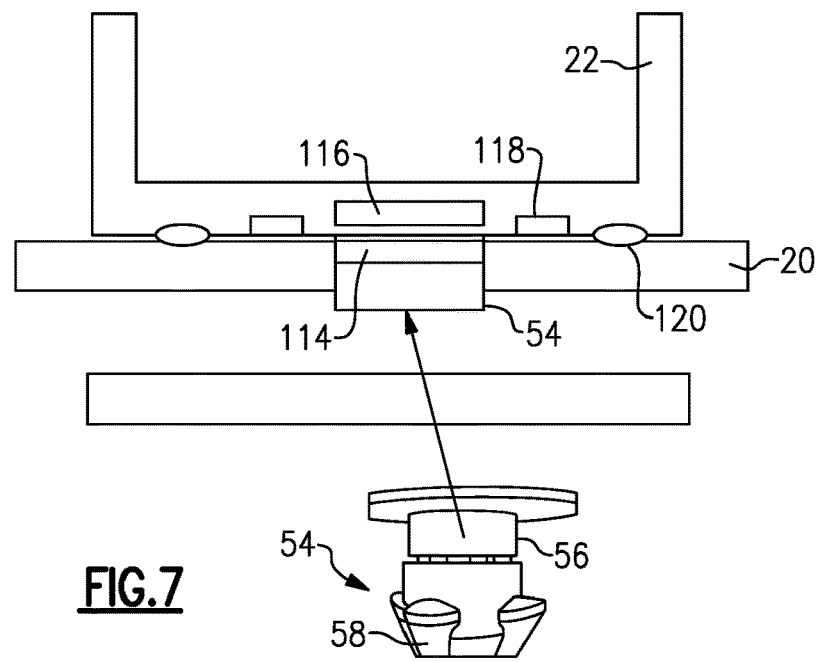
FIG. 7 is a schematic view of the transmitting puck of FIG. 3 as installed in a baseplate and aligned with a receiver of an accessory.

FIG. 7 shows the transmitting puck 54 fixed to the baseplate 20 and aligned with a receiving coil 116 in an accessory 22. Once the receiving coil 116 and transmitting coil 114 within the puck 54 are aligned, the wireless power link 32 can be activated to provide power to the accessory 22. In one example, each accessory 22 includes a band shield 118 to prevent any electromagnetic effects from affecting external surroundings. Additionally, each accessory 22 includes a seal 120 extending around a lower periphery of the accessory 22 to prevent water and/or debris from entering a space between the accessory 22 and the baseplate 20 that surrounds the puck 54. In one example, the seal 120 can comprise a thin foam rubber seal that also reduces noise, vibration, and harshness (NVH) issues by creating a compression fit. Optionally, the rubber could be impregnated with iron and conductive additives and to replace the band shield 118.

The subject disclosure also provides a setup feature to determine where the transmitting pucks 54 have been inserted in the baseplate 20. In one example, the setup feature is associated with a control module or system controller C and comprises one or more of the following: a user actuated setup button interface I which generates a first command to connect with each accessory 22 and to instruct each accessory 22 to turn off, and then generates a second command to turn on each puck 54 one by one to learn which pucks 54 match which accessory 22; a camera 122 is used to identify where each puck 54 is located on the baseplate 20; near-field communication (NFC) or radio frequency identification (RFID) tag is used for puck location; unique quick response (QR) code on each puck 54 can be scanned by a smart device; a map is made of where each accessory is placed such that as accessories are placed over the pucks 54, the inductive transmitter and inductive receiver power up and report activation. These will be discussed in greater detail below.

Power can be supplied to the baseplate 20 via connection to the vehicle power source 44 via any suitable electrical connection interface between the power source and the power distribution harness 46. In one example, all transmitting coils 114 are powered in parallel. Optionally, the transmitting coils 114 could be individually wired with power being turned on/off to each coil 114 individually. In another example, the baseplate 20 could include switches to identify each charge hole that is occupied by a puck 54. Additionally, each accessory 22 is connected to the vehicle via BLE/UWB/wifi interface such that power can be controlled by the vehicle either from the receiver side or from the transmitter side.

Initially, transmitting pucks 54 are plugged in during set up. Next, it is important to verify that the coils 114 are working. Coils 114 when powered up can respond to roll call (a partial test of working) initiated by the controller C. However, it is necessary to determine where each coil 114 is because they are all in parallel. The first step is to determine where coils 114 have been plugged in. There are many different methods that can be used.

In one example, after accessories 22 are placed on the baseplate 20, a setup input I (button, switch, touch screen/input pad) is actuated on the vehicle. The input I communicates with the system control module or controller C. The vehicle then connects with each accessory 22 and then instructs the accessory 22 to turn off. Then coils 114 are turned on one by one which allows the system to learn which coils 11 match which accessory 22.

Figure 8A:
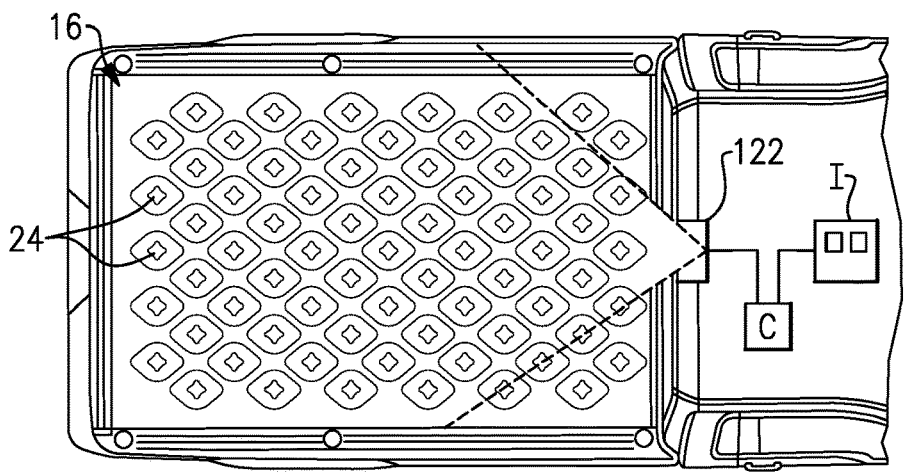
FIG. 8A shows a camera in view of an entire truck bed that includes an induction grid system.
Figure 8B:
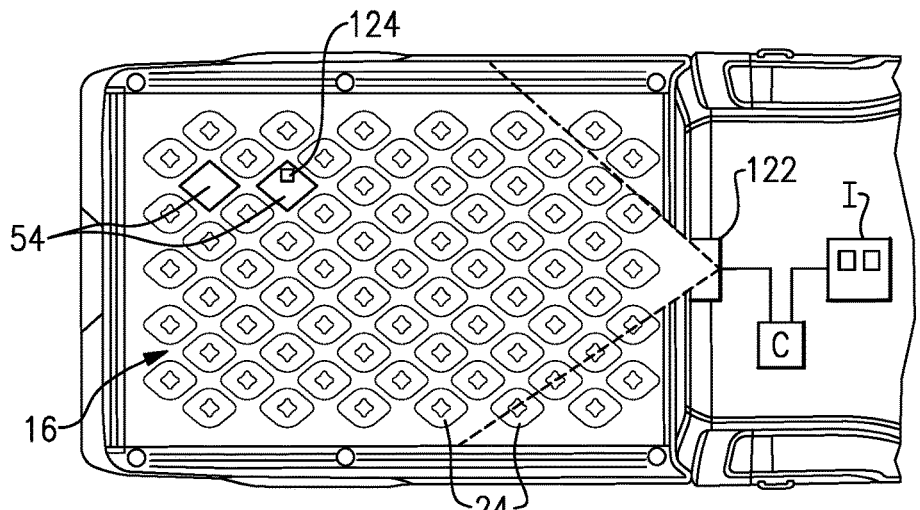
FIG. 8B shows the truck bed of FIG. 8A with pucks installed in the induction grid system.
Figure 8C:
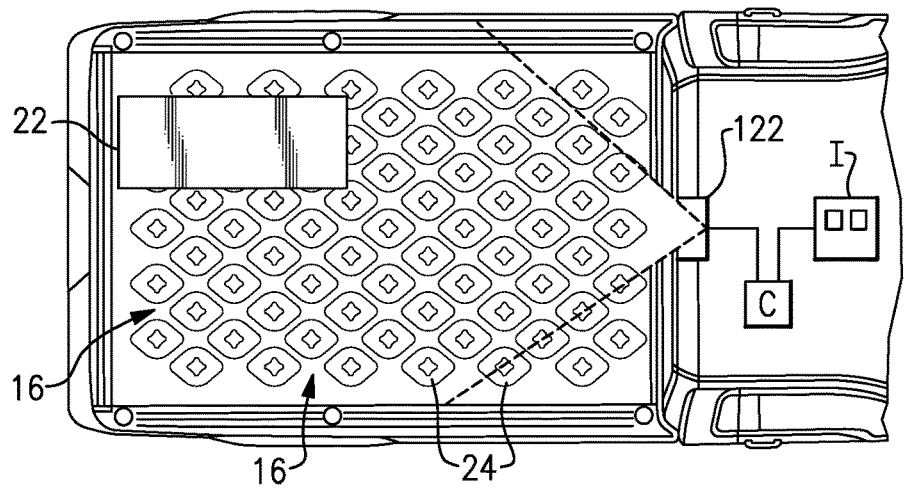
FIG. 8C shows the truck bed of FIG. 8A with an accessory installed over the pucks of FIG. 8B.

In another example, a Center High Mounted Stop Lamp (CHMS) camera 122 is used to identify transmitting puck 54 locations. As shown in FIG. 8A, the camera 122 has a view of the baseplate 22. FIG. 8B shows transmitting pucks 54 installed in desired locations on the baseplate 20. The camera 122 identifies where the pucks 54 have been plugged into the baseplate 22. This is important because later when an accessory 20 is placed over the puck 54 as shown in FIG. 8C, the accessory 22 will power up and report it is getting power from that puck 54.

In another example, a code/tag 124, e.g. NFC or RFID tag, is used for puck location; however, this is more expensive.

In another example, a code/tag 124, e.g. unique QR code, on the puck 54 can be scanned by a smart device and entered into the system through a touch screen/smart device.

In another example, a map is made of where each accessory 22 is placed. As, accessories 22 are placed over the pucks 54 the transmitting 114 and receiver 116 coils power up. Either the accessory 22 can report it is receiving power to the vehicle or the transmitting coil 114 can report it is transmitting power. This allows the vehicle to report via a sound exciter or system communication to the customer that coils are successfully working. This allows them to move on to installing the next accessory 22.

Note that the vehicle now knows the location of each accessory 22 and the number of coils that power it as there may be more than one coil. Coils might only power 30W each so a larger box might need 2-3 coils to get the power level desired.

The subject disclosure provides an inductive puck connection system having a self-locking and tightening arrangement with an easy releasing mechanism. The pucks 54 are easily swappable and reconfigurable in manner different mounting configurations. The pucks 54 provide for semi-permanent attachment and have a slidable upper surface for easy alignment with receivers in accessories 22. The puck 54 also is spring-loaded to provide for vertical compensation along a z-axis and to mitigate vibration. The subject disclosure also provides for a setup feature to determine where the transmitting pucks 54 have been inserted in the baseplate 20 such that when accessories 22 are placed on the pucks 54, the control system can identify which pucks are associated with which accessories. This allows individual accessories to be independently powered as needed.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. An inductive connection system, comprising:
a baseplate that provides an attachment interface on a support surface, the baseplate configured to engage with at least one accessory via the attachment interface to secure the accessory to the support surface, and wherein the attachment interface provides a plurality of different mounting positions for the at least one accessory; and
at least one puck selectively coupled to the attachment interface to provide a desired one of the plurality of different mounting positions, wherein one of the at least one puck and the at least one accessory includes an inductive transmitter and the other of the at least one puck and the at least one accessory includes an inductive receiver such that the at least one puck in the baseplate and the at least one accessory electrically connect to each other through a wireless electrical power link between the inductive transmitter and the inductive receiver when the at least one accessory is mounted in the desired one of the plurality of different mounting positions.

2. The inductive connection system of claim 1, wherein the at least one puck comprises a head portion and a foot portion that is selectively moveable between a locked position where the at least one puck cannot be detached from the baseplate and an unlocked position where the at least one puck can be detached from the baseplate.

3. The inductive connection system of claim 2, wherein the attachment interface comprises a plurality of puck holes formed within the baseplate, and wherein the plurality of puck holes are each configured to receive the foot portion such that once the foot portion is inserted through a selected one of the plurality of puck holes, the head portion is then rotated to move the at least one puck into the locked position.

4. The inductive connection system of claim 3, wherein the foot portion includes beveled sides to facilitate insertion through the selected one of the plurality of puck holes.

5. The inductive connection system of claim 2, wherein the head portion and the foot portion are coupled together with at least one fastener connection that comprises a male portion secured to one of the head portion and the foot portion and a female portion that receives the male portion, and including a resilient member that cooperates with the at least one fastener connection to provide spring-loaded clamping which allows a desired range of compensation movement between the head portion and the foot portion.

6. The inductive connection system of claim 1, wherein the at least one puck comprises a polygonal shape.

7. The inductive connection system of claim 1, wherein the at least one puck comprises a plurality of pucks and the attachment interface comprises a plurality of puck holes formed within the baseplate, and wherein two or more of the plurality of pucks are inserted into selected ones of the plurality of puck holes to provide multiple desired mounting positions for two or more accessories.

8. The inductive connection system of claim 7, including a setup feature to determine where the two or more of the plurality of pucks have been inserted in the baseplate.

9. The inductive connection system of claim 8, wherein the setup feature comprises one or more of the following:
a user actuated setup button which generates a first command to connect with each accessory and to instruct each accessory to turn off, and then generates a second command to turn on each puck one by one to learn which pucks match which accessory;
a camera that identifies where each puck is located on the baseplate;
NFC or RFID tag that identify puck location;
unique QR code on each puck that can be scanned by a smart device;
a map is made of where each accessory is placed such that as accessories are placed over the pucks, the inductive transmitter and inductive receiver power up and report activation.

10. The inductive connection system of claim 7, wherein all pucks of the plurality of pucks are powered in parallel.

11. The inductive connection system of claim 7, wherein all pucks of the plurality of pucks are powered individually or by way of a switch.

12. The inductive connection system of claim 1, wherein each accessory includes a band shield to prevent any electromagnetic effects from affecting external surroundings.

13. The inductive connection system of claim 1, wherein each accessory includes a seal extending around a lower periphery of the accessory to prevent water and/or debris from entering a space between the accessory and the baseplate that surrounds the at least one puck.

14. An inductive connection system, comprising:
a baseplate that provides an attachment interface on a support surface, the baseplate configured to engage with a plurality of accessories via the attachment interface to secure the plurality of accessories to the support surface, and wherein the attachment interface provides a plurality of different mounting positions for the plurality of accessories; and
a plurality of pucks selectively coupled to the attachment interface to provide a desired one of the plurality of different mounting positions for each accessory, wherein each puck includes an inductive transmitter and each accessory includes an inductive receiver such that the pucks in the baseplate and the plurality of accessories electrically connect to each other through a wireless electrical power link between the inductive transmitters and the inductive receivers when the plurality of accessories are mounted in the desired mounting positions.

15. The inductive connection system of claim 14, wherein the attachment interface comprises a plurality of puck holes formed within the baseplate, and wherein each puck comprises a head portion and a foot portion that is selectively moveable between a locked position where puck cannot be detached from the baseplate and an unlocked position where the puck can be detached from the baseplate, and wherein the plurality of puck holes are each configured to receive the foot portion such that once the foot portion is inserted through a selected one of the plurality of puck holes, the head portion is then rotated to move the at least one puck into the locked position.

16. The inductive connection system of claim 15, wherein the attachment interface further comprises a plurality of mounting holes, and wherein each accessory includes at least one accessory foot that is inserted within one of the plurality of mounting holes.

17. The inductive connection system of claim 14, wherein the at least one puck comprises a diamond shape.

18. The inductive connection system of claim 14, including a setup feature to determine where two or more of the plurality of pucks have been inserted in the baseplate, wherein the setup feature comprises one or more of the following:
   a user actuated setup button which generates a first command to connect with each accessory and to instruct each accessory to turn off, and then generates a second command to turn on each puck one by one to learn which pucks match which accessory;
   a camera that identifies where each puck is located on the baseplate;
   NFC or RFID tag that identify puck location;
   unique QR code on each puck that can be scanned by a smart device;
   a map is made of where each accessory is placed such that as accessories are placed over the pucks, the inductive transmitter and inductive receiver power up and report activation.

19. An accessory attachment method, comprising:
   engaging at least one accessory to an attachment interface of a baseplate that provides a plurality of different mounting positions for the at least one accessory;
   selectively coupling at least one puck to the attachment interface to provide a desired one of the plurality of different mounting positions, wherein one of the at least one puck and the at least one accessory includes an inductive transmitter and the other of the at least one puck and the at least one accessory includes an inductive receiver; and
   electrically connecting the puck in the baseplate to the at least one accessory through a wireless electrical power link between the inductive transmitter and the inductive receiver when the at least one accessory is mounted in the desired one of the plurality of different mounting positions.

20. The method of claim 19, including providing the at least one puck with a head portion and a foot portion, and selectively moving the foot portion between a locked position where the at least one puck cannot be detached from the baseplate and an unlocked position where the at least one puck can be detached from the baseplate.

* * * * *